US010204431B1

(12) United States Patent
Hou et al.

(10) Patent No.: US 10,204,431 B1
(45) Date of Patent: Feb. 12, 2019

(54) POLYGON LABELING BY DOMINANT SHAPES

(71) Applicant: GOOGLE INC., Mountain View, CA (US)

(72) Inventors: Tingbo Hou, San Bruno, CA (US); Bent Hagemark, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 555 days.

(21) Appl. No.: 14/331,574

(22) Filed: Jul. 15, 2014

(51) Int. Cl.
G06T 11/20 (2006.01)
G06K 9/46 (2006.01)

(52) U.S. Cl.
CPC .......... *G06T 11/203* (2013.01); *G06K 9/4604* (2013.01); *G06T 2210/12* (2013.01); *G06T 2219/004* (2013.01); *G06T 2219/2004* (2013.01)

(58) Field of Classification Search
CPC ....... G06T 11/001; G06T 11/60; G06T 15/30; G06T 11/40; G06T 11/203; G06T 17/05; G06T 7/606; G06T 7/0042; G06T 2210/12; G06T 2219/004; G06T 2219/2004; G09G 5/14; G06K 15/02; G06K 9/036; G06K 9/32; G06K 9/4604; G06F 3/0481; G06F 9/4443
USPC ....... 345/581, 619, 622, 629, 441–443, 467, 345/468; 382/113, 286, 288, 291, 292; 715/764, 765
See application file for complete search history.

(56) References Cited

U.S. PATENT DOCUMENTS

| 6,091,424 | A | 7/2000 | Madden et al. |
| 6,665,840 | B1 * | 12/2003 | Wiley ..................... G06T 11/40 345/587 |
| 7,414,637 | B2 | 8/2008 | Fogel et al. |
| 7,692,655 | B2 | 4/2010 | Ni |
| 8,482,582 | B2 | 7/2013 | Gelber |

(Continued)

FOREIGN PATENT DOCUMENTS

CN 103309938 A 9/2013
WO WO-2010/0126176 A1 11/2010

OTHER PUBLICATIONS

"Selecting a Polygon Label Position," (2011). Retrieved from the Internet at URL:http://help.arcgis.com/en/arcgisdesktop/10.0/help/index.html.

(Continued)

*Primary Examiner* — Ke Xiao
*Assistant Examiner* — Andrew Shin
(74) *Attorney, Agent, or Firm* — Marshall, Gerstein & Borun LLP

(57) ABSTRACT

A method for generating label positions for labeling polygons includes receiving a description of a polygon, determining an inscribed circle within the polygon, and determining a single-branch shape that fits completely within the polygon. The method also includes generating an indication of a first candidate label position, based on the inscribed circle, and generating an indication of a second candidate label position, based on the centerline. Still further, the method includes providing the indication of the first candidate label position and the indication of the second candidate label position to a rendering component for positioning a label for the polygon in accordance with at least one of the first candidate label position and the second candidate label position.

14 Claims, 13 Drawing Sheets

(56) References Cited

U.S. PATENT DOCUMENTS

| | | | | |
|---|---|---|---|---|
| 2005/0062763 A1* | 3/2005 | Keim | ............... | G09B 29/00 |
| | | | | 345/647 |
| 2005/0172247 A1* | 8/2005 | Papadopoulou | .... | G06F 17/5081 |
| | | | | 716/112 |
| 2010/0318334 A1* | 12/2010 | Momma | ............ | G06K 9/6269 |
| | | | | 703/6 |
| 2011/0157220 A1* | 6/2011 | Kim | ............... | G09B 11/00 |
| | | | | 345/619 |
| 2012/0245841 A1 | 9/2012 | Spindler et al. | | |
| 2014/0354629 A1* | 12/2014 | Adlers | ............... | G06T 3/60 |
| | | | | 345/419 |

OTHER PUBLICATIONS

Been et al., "Dynamic Map Labeling," Visualization and Computer Graphics, IEEE Transactions, 12(5):773-780 (2006). Abstract Only.

Giesen et al., "The Scale Axis Transform," Proceedings of the Twenty-Fifth Annual Symposium on Computational Geometry, pp. 106-115 (2009). Abstract Only.

Kakoulis et al., "Labeling Algorithms," Handbook of Graph Drawing and Visualization, Chapter 15, pp. 489-515 (2013).

Kang, Using Shape Analysis for Placement of Polygon Labels, (2014). Retrieved from the Internet at URL:http://proceedings.esri.com/library/userconf/proc01/professional/papers/pap388/p388.htm.

\* cited by examiner

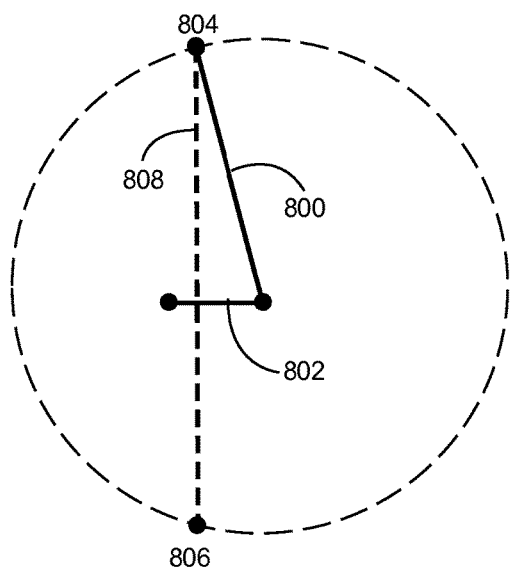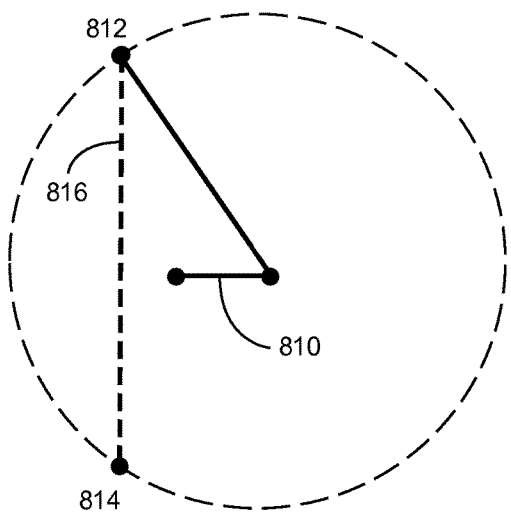
*Fig. 8A*  *Fig. 8B*

POLYGON LABELING BY DOMINANT SHAPES

FIELD OF TECHNOLOGY

The present disclosure relates generally to labeling digital images, such as digital maps, and, more particularly, to determining label positions based on one or more dominant shapes corresponding to a polygon.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Polygon labeling is a common problem in geographic information systems and geographic visualization. Two types of labels are widely used to label polygons, point-type and line-type positions. Systems using point-type labels place labels horizontally or vertically at relative positions of given points, while systems using line-type labels place labels at positions along certain lines inside or outside polygons. To find these given points or lines, systems utilize methods based on inside buffering and medial axes of polygons. However, label positions generated using these methods can be jumbled, especially for complicated polygons (e.g., polygons with holes).

SUMMARY

A system of this disclosure determines, for a certain polygon, positions of a label based on two dominant shapes of the polygon: (i) a substantially largest inscribed circle that completely fits within the polygon, and (ii) single-branch shape with a centerline having a substantially largest coverage of the polygon. The single-branch shape is completely enclosed within the polygon, and the centerline of the single-branch shape has only branch (e.g., the centerline does not split or include loops). The edges of the single-branch shape can include at least some of the boundary edges of the polygon and arcs connecting boundary edges of the polygon being labeled. The system can generate these dominant shapes using Voronoi diagram(s), for example. A rendering module that labels the polygon in accordance with at least one of these dominant shapes can be implemented in a client device, one or more servers, or any combination thereof. The system can provide to the rendering module an indication of the substantially largest inscribed circle, and/or an indication of a bounding box for the substantially largest inscribed circle. The system also can provide an indication of the centerline of the single-branch shape and/or a smoothed version of the centerline. The rendering module then positions a label inside the bounding box for the substantially largest inscribed circle or along the centerline of the single-branch shape. Depending on the implementation or a particular scenario, the rendering module selects between candidate positions inside the bounding box or along the centerline in view of the type of the label (e.g., area label vis-à-vis road label), whether the label fits inside the bounding box, and/or other factors.

More particularly, one implementation of these techniques is a method for generating label positions for labeling polygons. The method comprises receiving, by one or more processors, a description of a polygon, determining, by the one or more processors, an inscribed circle within the polygon, and determining, by the one or more processors, a single-branch shape that fits completely within the polygon, wherein a centerline of the single-branch shape has only one branch. The method also includes generating, by the one or more processors, an indication of a first candidate label position, based on the inscribed circle, and generating, by the one or more processors, an indication of a second candidate label position, based on the centerline. Still further, the method includes providing, by the one or more processors, the indication of the first candidate label position and the indication of the second candidate label position to a rendering component for positioning a label for the polygon in accordance with at least one of the first candidate label position and the second candidate label position.

Another implementation is a computing device comprising one or more processors and a non-transitory computer readable medium. The non-transitory computer readable medium stores instructions thereon that, when executed by the one or more processors, cause the computing device to receive a description of a polygon, determine an inscribed circle within the polygon, and determine a single-branch shape that fits completely within the polygon, wherein a centerline of the single-branch shape has only one branch. The instructions also cause the computing device to generate an indication of a first candidate label position, based on the inscribed circle, and generate an indication of a second candidate label position, based on the centerline. Still further, the instructions cause the computing device to provide the indication of the first candidate label position and the indication of the second candidate label position to a rendering component for positioning a label for the polygon in accordance with at least one of the first candidate label position and the second candidate label position.

In still another implementation a method of rendering labeled polygons comprises receiving, from a network server, an indication of the first candidate label position and an indication of the second candidate label position corresponding to a polygon. The indication of the first candidate label position is based on an inscribed circle within the polygon, and the indication of the second candidate label position is based on a single-branch shape that fits completely within the polygon, wherein a centerline of the single-branch shape has only one branch. The method also includes generating, by a rendering module, an image of the polygon labeled with a label, wherein the label is positioned according to at least one of the indication of the first candidate label position or the indication of the second candidate label position, and presenting, at a user interface, the image of the polygon labeled with the label.

BRIEF DESCRIPTION OF THE DRAWINGS

FIGS. 8A and 8B illustrate segments of a Voronoi diagram used to determine a maximum inscribed circle, such as the maximum inscribed circle illustrated in FIG. 5B;

DETAILED DESCRIPTION

The techniques of the present disclosure may be utilized to label polygons, such as polygons representing roads, buildings, counties, cities, states, lakes, etc. on a digital map (referred to herein as map features). To this end, a computing device (e.g., network server) determines at least two dominant shapes corresponding to a polygon, a substantially largest (e.g., maximum) inscribed circle and a single-branch shape. The maximum inscribed circle is the largest circle that can be completely enclosed within the polygon, and the single-branch shape is a shape enclosed in the polygon and having a centerline with only one "branch." To define the position of a polygon label, the computing device generates a rectangle enclosing the circle (e.g., a bounding box) and a smoothed line based on the centerline of the single-branch shape.

Upon providing the rectangle and smoothed line to a client device, the client device may place the polygon label inside the rectangle or along the smoothed line within a rendering of a digital map. In this manner, client devices may consistently position labels within the digital map rendering while maintaining a visually clear correspondence between polygons and respective labels. For example, road labels may be placed along a smoothed line corresponding to the road and a nearby label for a body of water may be place within a rectangle corresponding to the lake.

For clarity, an example computing system in which some or all of the techniques outlined above can be implemented is discussed with reference to FIG. 1.

System Overview

Figure 1:
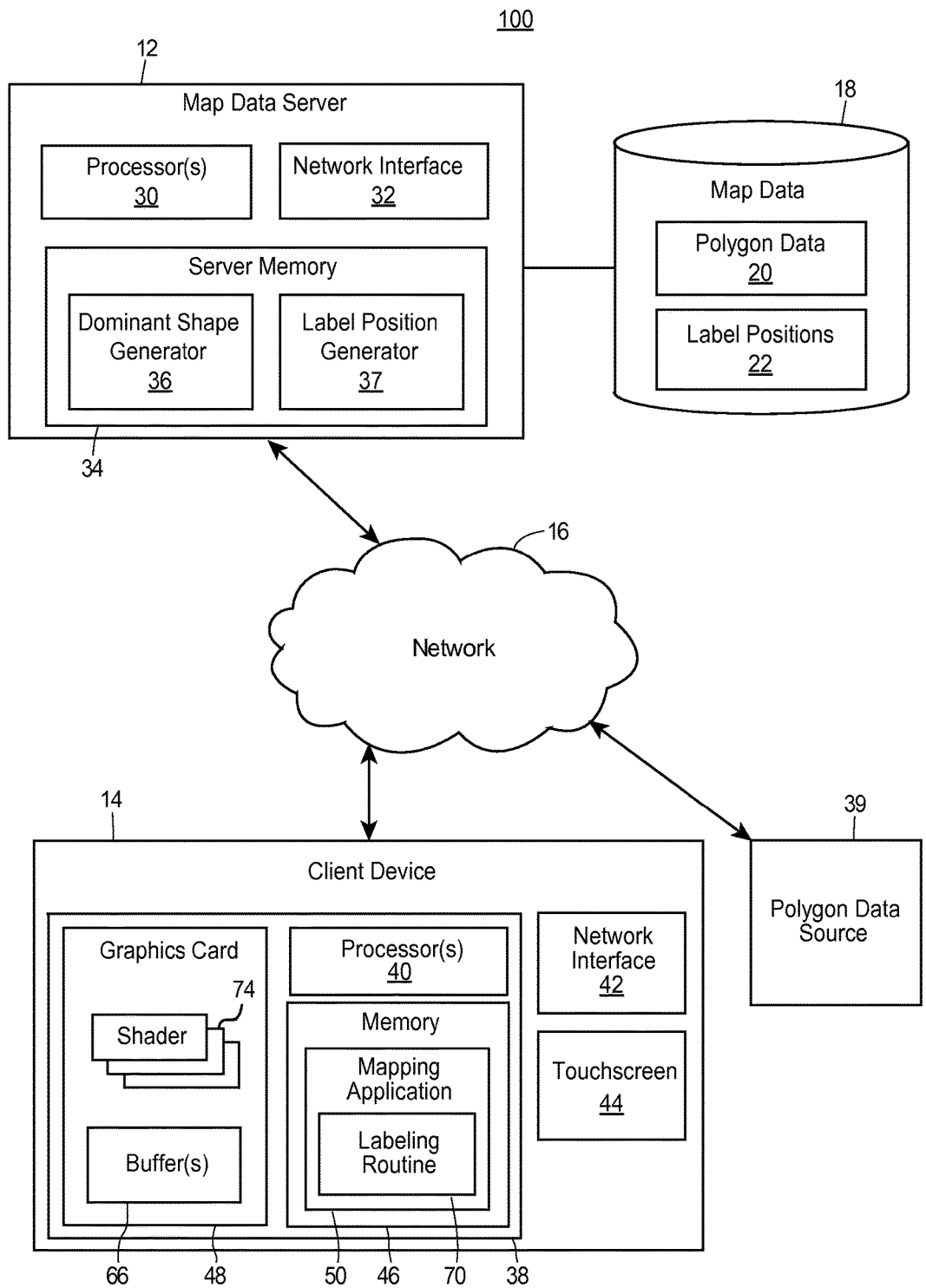
FIG. 1 illustrates an example computing system for generating polygon label positions and rendering labeled polygons with labels at the polygon label positions.

FIG. 1 is a block diagram of an example computing system 100 for generating positions for polygon labels and labeling polygons with labels at those positions. A map data server 12 provides map data (e.g., polygon vertices, polygon labels, and positions for polygon labels) to a client device 14 via a communication network 16 for rendering an interactive digital map. Map data, which can be stored in a map database 18, can include polygon data 20 stored in a vector format. The vector polygon data 20 may define or include image object elements that each have two or more vertices or vertex data points defining the elements or primitives to be displayed within an image. Generally speaking, the polygon data 20 may define such image object elements using a set of vertices, which, along with corresponding labels positioned as described herein, are used to display an image object to a user via the client device 14. In one implementation, one or more polygons indicated in the polygon data 20 may define footprints of geographic features such as roads, lakes, building, etc. (referred to herein as "map features"), utilized by a mapping application 50 executed on the client device 14. Map features may be defined in a vector graphics format or another suitable scalable format. In some implementations, the map database 18 may also store raster images in a bitmap format and labels (e.g., text identifications) corresponding to at least some map features stored in the map database 18.

Still further, the map database 18 may store label positions 22. For polygons indicated in the polygon data 20, the label positions 22 may include a rectangle and a smoothed line such that a point-type label of the respective polygon may be placed within the rectangle and a line-type label of the respective polygon may be placed along the smoothed line. The map data server 12 may generate the rectangle as a bounding box (e.g., a smallest bounding box) of a maximum inscribed circle within the polygon, and the map data server 12 may generate the smoothed line based on a centerline of a single-branch shape. Further details regarding the generation of rectangles and lines based on maximum inscribed circles and single-branch shapes are discussed with reference to FIGS. 5B, 5C, 6A, 6B, and 12.

According to some implementations, when the client device 14 requests map data for a certain geographic area, the map data server 12 provides (e.g., to the client device 14 via the network 16) indications of polygons (e.g., vertices) corresponding to the certain geographic area along with labels and positions for labeling the polygons. The positions may include rectangles and lines, as discussed further with reference to FIG. 2. For example, the map data server 12 may provide indications of polygons representing various counties in a geographic area along with labels (e.g., county names) for those counties and positions for the labels. Generally, labels may identify any type of map features, such as businesses, counties, cities, lakes, parks, etc., With continued reference to FIG. 1, the map data server 12 can be implemented as a single device or as a group of devices. One or more of these devices can include one or more processors 30, a network interface 32, and a non-transitory computer-readable memory 34 that stores instructions executable on the one or more processors 30. For example, a dominant shape generator 36 can determine and generate indications of maximum inscribed circles and single-branch shapes corresponding to polygons, and a label position generator 37 may, based on those dominant shapes, generate rectangles and smoothed lines for positioning polygon labels.

Similarly, the map database 18 can be implemented in a single storage device or multiple storage devices. The communication network 16 can include any suitable number of Internet links, local area links, long-range wireless link, short-range wireless links, etc.

In some implementations, the map data server 12 may receive new, additional, or different polygon data (e.g., vertices) from a polygon data source 39, which new, additional, or different polygon data may be processed by the map data server 12 and stored in the map database 18. In this manner, the map data server 12 may update and increase the size of the polygon data 20. For example, the polygon data 20 may at least partially be "crowdsourced" or otherwise received from various computing devices, such as the polygon data source 39, operated by users of a mapping application, where the mapping application is served with map data by the map data server 12. In many cases, polygon data received in such a manner may lack labels and/or positions for labels. As such, the map data server 12 may utilize the dominant shape generator 36 and the label position generator 37 to generated positions for labeling this new, additional, or different polygon data. The map data server 12 may then update the polygon data 20 and the label positions 22 with the new, additional, or different polygon data and corresponding label positions.

In the example system 100 of FIG. 1, the client device 14 is a portable device such as a smartphone or tablet computer, for example. In general, however, the techniques for labeling polygons can be utilized both in portable and non-portable computing devices. In this example, a rendering module 38 of the client device 14 implements a polygon labeling technique that includes positioning labels in rectangles (corresponding to maximum inscribed circles) and along smoothed lines (based on centerlines of single-branch shapes), as discussed further with reference to FIG. 13.

The client device 14 includes the rendering module 38, a network interface 42 configured to communicate with other devices via the network 16, and a touchscreen 44 configured to receive gesture-based input and to display rendered images generated by the rendering module 38. The rendering module 38 includes one or more general-purpose processors 40, a non-transitory computer-readable memory 46, and a graphics card 48 (e.g., including one or more graphics processing units, or GPUs) that has buffer(s) 66. In other implementations, the client device 14 may include additional components or, conversely, not include some of the components illustrated in FIG. 1.

The memory 46 of the client device 14 stores a mapping application 50 that generates interactive digital maps. Depending on the implementation, the mapping application 50 can operate as a standalone application or as a component of another application such as a web browser, for example. The mapping application 50 includes a labeling routine 70. In operation, the labeling routine 70 positions polygon labels within rectangles and/or along smoothed lines as indicated in received label positions from the map data server 12. The labeling routine 70 may encode this positioning, along with vertices, labels, etc. received from the map data server 12 (and in some cases cached on the client device 14), into vertex data passed to the graphics card 48 for rendering labeling polygons. The graphics card 48 may execute the one or more shaders 74 (e.g., vertex and/or fragment shaders) to render map features according to the encoded label positions.

Label Positions and Dominant Shapes

Figure 2:
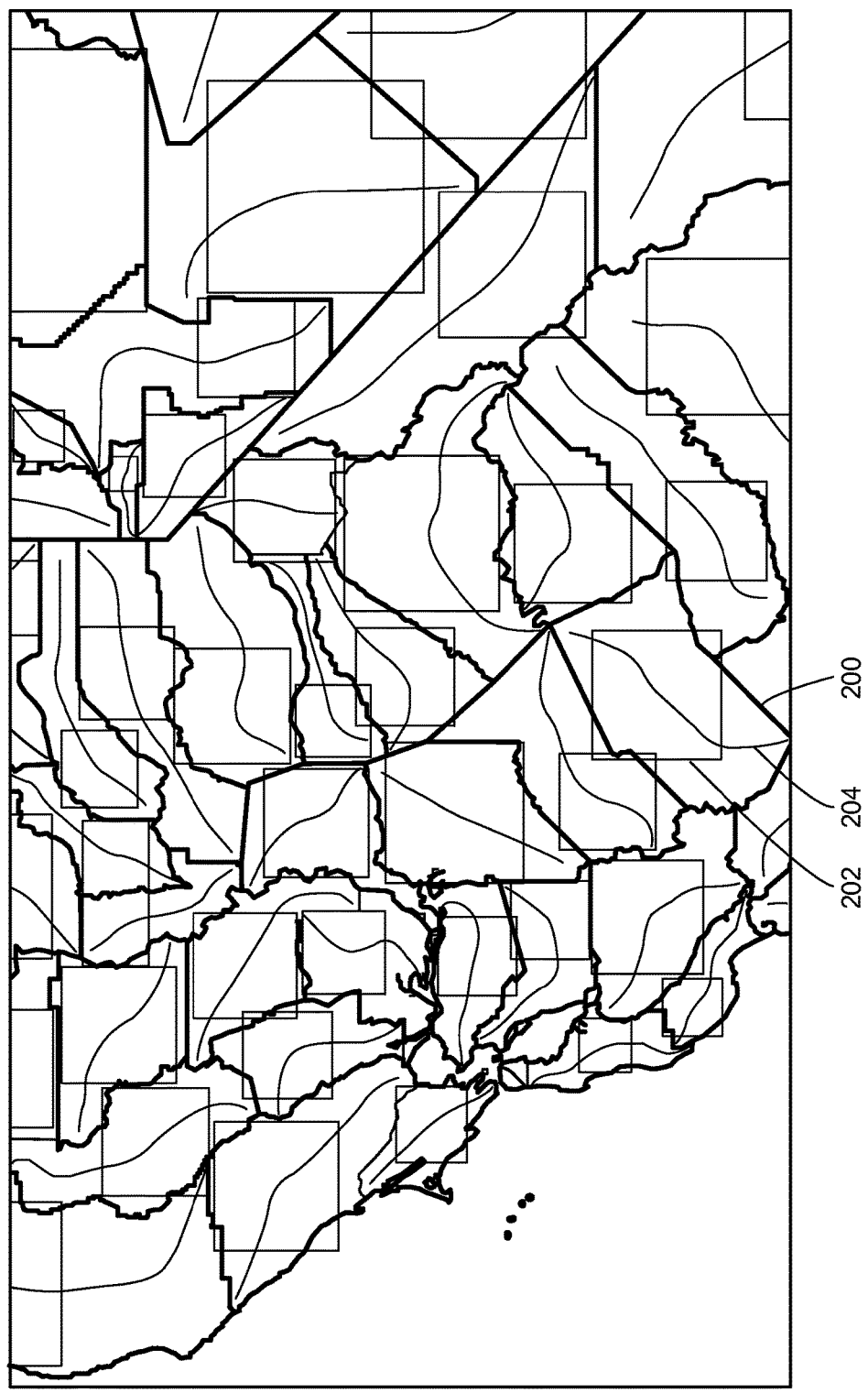
FIG. 2 illustrates example rectangles and lines utilized to label map features which can be generated by the system depicted in FIG. 1.

FIG. 2 illustrates example polygons representing map features along with corresponding rectangles and lines utilized to position labels for the polygons. The rectangles and lines may be generated by the map server 12, for example, using dominant shapes, as further discussed with reference to FIGS. 5B, 5C, 6A, 6B, and 12.

In particular, the polygons illustrated in FIG. 2 (with solid lines) may represent counties, cities, states, or other geographic areas in a digital map. The map server 12 may generate a rectangle and smoothed line (illustrated in FIG. 2 with dotted lines) for each of the polygons to allow a label to be placed at least one of within the rectangle or along the smoothed line. For example, for a particular polygon 200, the map data server 12 (e.g., executing the dominant shape generator 36 and the label position generator 37) may generate the rectangle 202 and the smoothed line 204.

Figure 3:
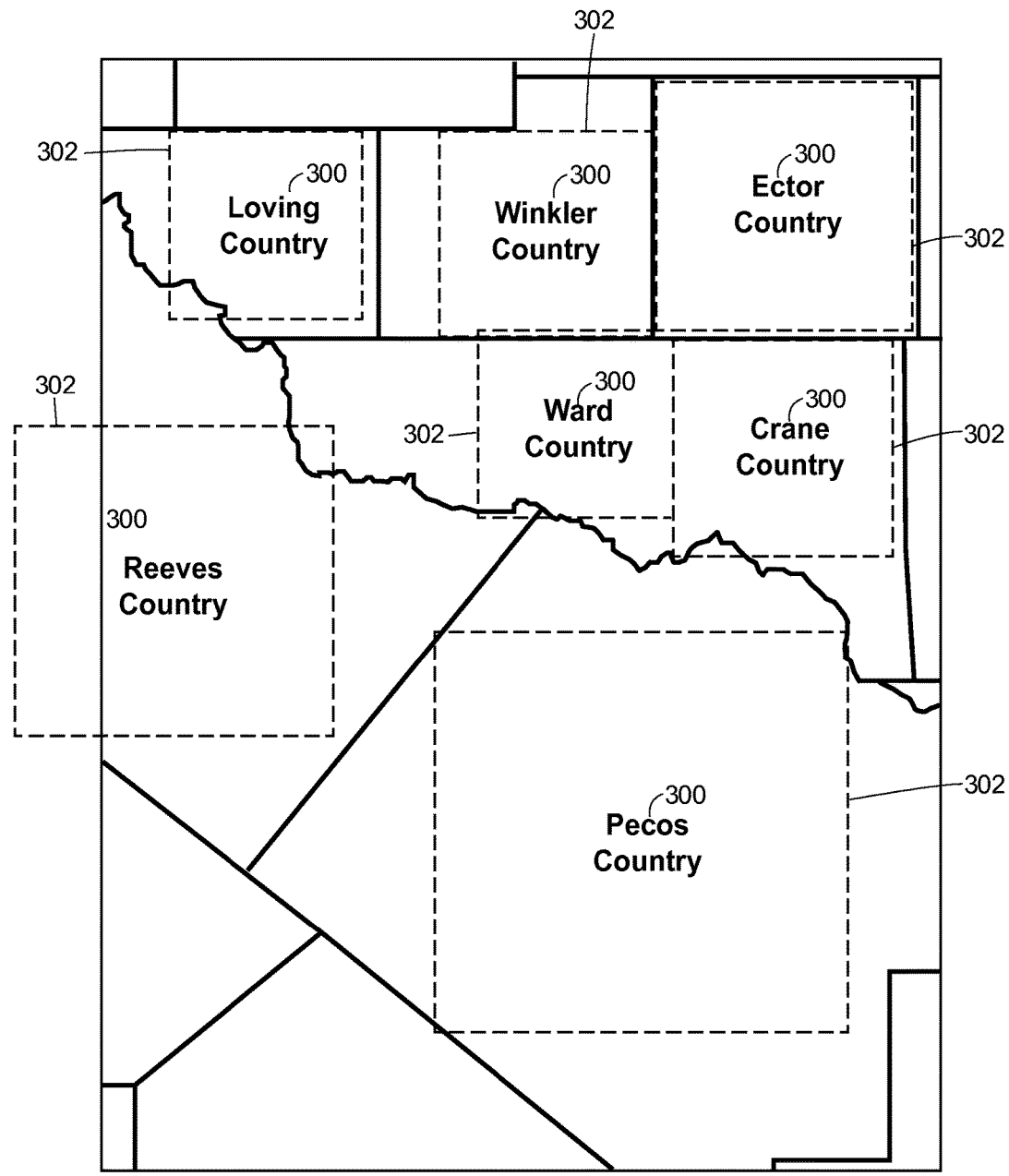
FIG. 3 is a screenshot of a digital map labeled with labels positioned within rectangles, such as the rectangles illustrated in FIG. 2.
Figure 4:
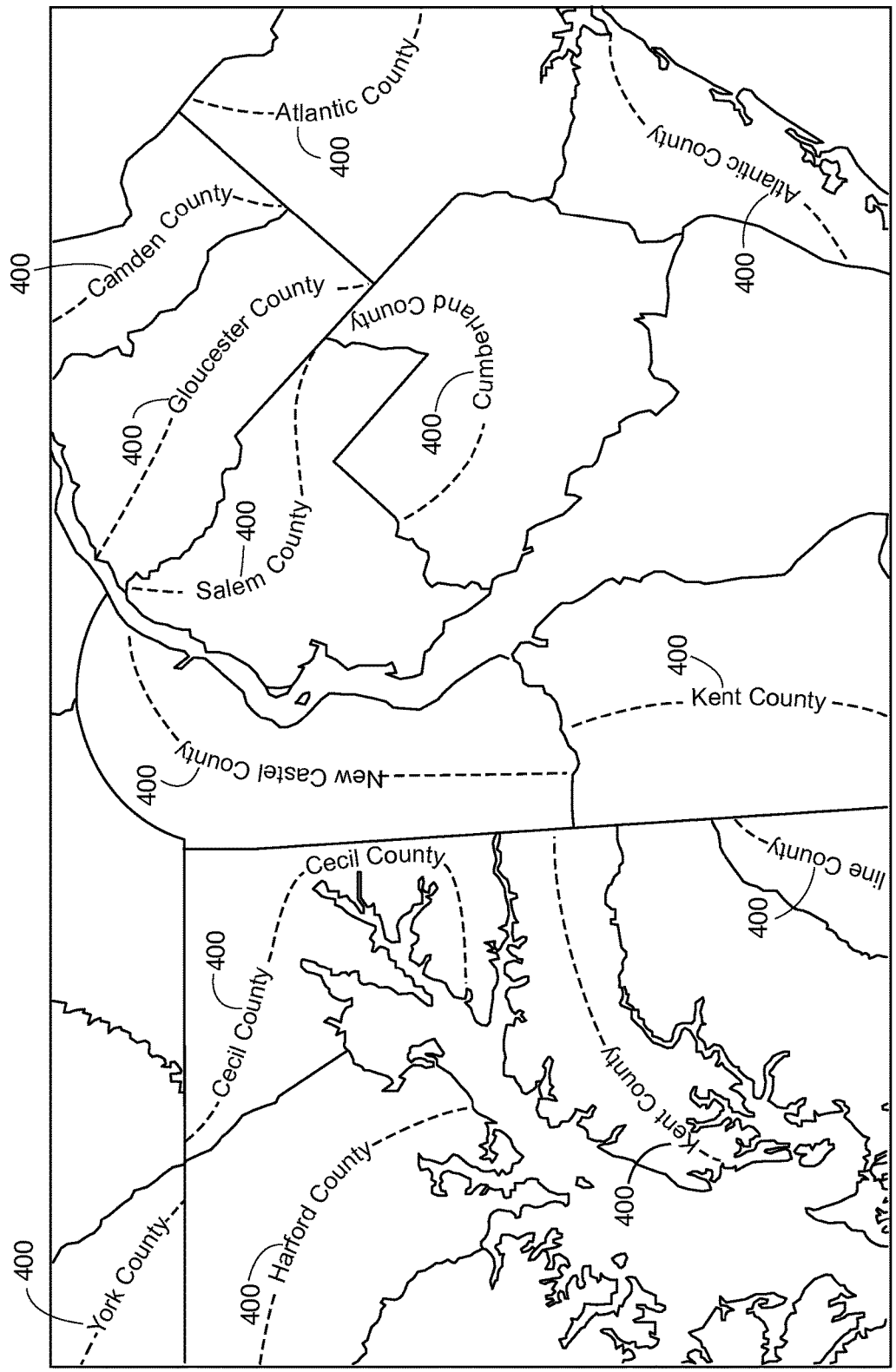
FIG. 4 is a screenshot of a digital map labeled with labels positioned along lines, such as the lines illustrated in FIG. 2.

When rendered, the polygons illustrated in FIG. 2 may be labeled according to the rectangles, such as the rectangle 202, in an implementation. As illustrated in FIG. 3, the map server 12 may generate positions for one or more labels 300 inside of one or more rectangles 302. The labels 300 may be pre-defined (e.g., within a mapping application) as point-type labels and, thus, may be positioned using the rectangles 302 rather than smoothed lines. However, the polygons illustrated in FIG. 2 may also be labeled according to the smoothed lines, such as the smoothed line 204, in an implementation. FIG. 4 illustrates example labels 400 positioned along smoothed lines. These labels 400 may be line-type labels pre-defined to be placed along lines, such as the smoothed lines illustrated in FIG. 2.

Maps, or other digital images, may generally include any combination of point-type and line-type labels positioned inside of rectangles and along smoothed lines. For example, a mapping application may include some labels, such as state names, as line-type labels positioned along smoothed lines and other labels, such as city names, as point-type labels positioned inside of rectangles. A mapping application may place labels at any suitable positions inside of the rectangles or along the smoothed lines, such as in the center, top, bottom, beginning, end, etc. In some implementations, mapping applications may also place labels repeatedly inside of rectangles or along lines, as discussed further with reference to FIG. 10.

Figure 5A:
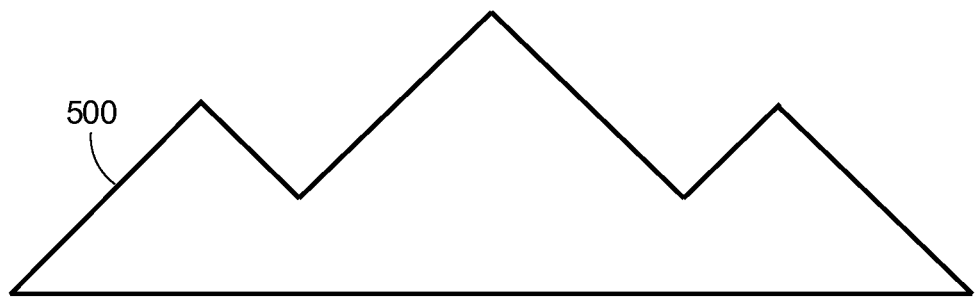
FIG. 5A illustrates an example polygon which may be labeled by the system illustrated in FIG. 1.
Figure 5B:
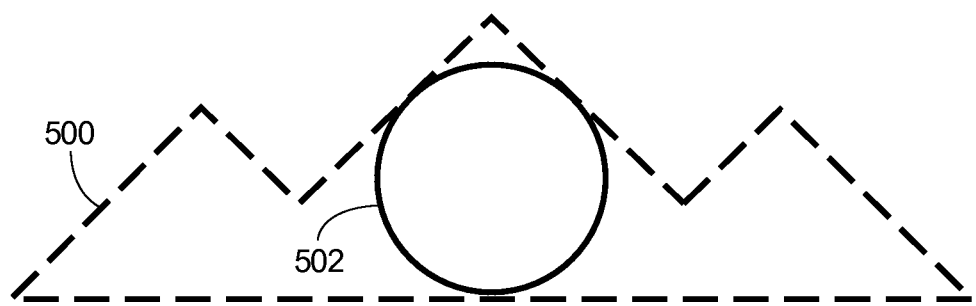
FIG. 5B illustrates a maximum inscribed circle corresponding to the example polygon illustrated in FIG. 5A.
Figure 5C:
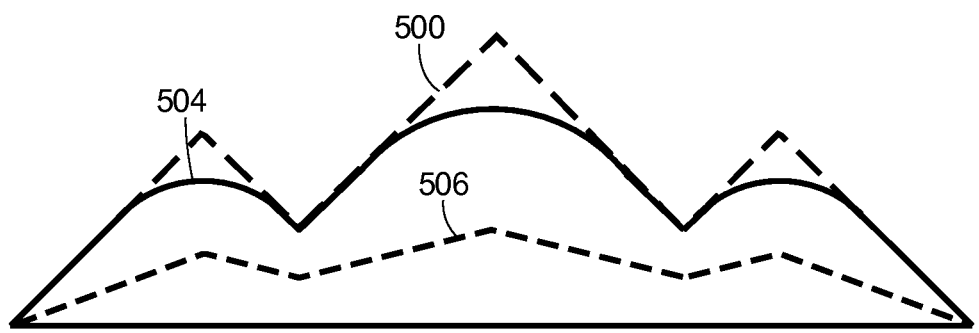
FIG. 5C illustrates a single-branch shape corresponding to the example polygon illustrated in FIG. 5A.
Figure 6A:
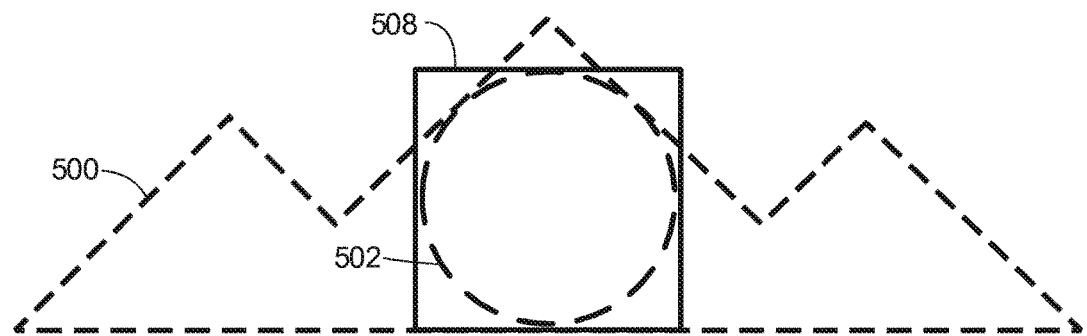
FIG. 6A illustrates an example rectangle based on the maximum inscribed circle illustrated in FIG. 5B, which rectangle can be used to position a label for the example polygon illustrated in FIG. 5A.
Figure 6B:
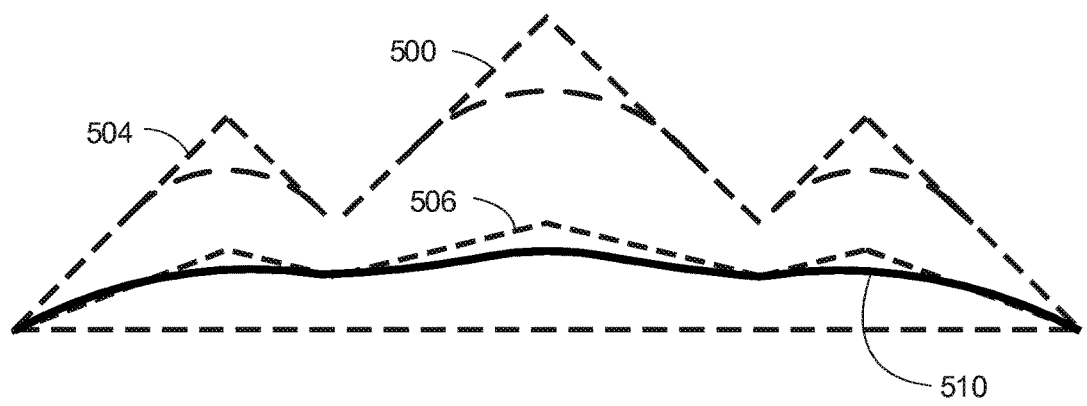
FIG. 6B illustrates an example smoothed line based on the centerline of the single-branch shape illustrated in FIG. 5C, which smoothed line can be used to position a label for the example polygon illustrated in FIG. 5A.

To generate rectangles and smoothed lines, such as those illustrated in FIG. 2, for positioning point-type and line-type labels, the map data server 12 may: (i) determine dominant shapes, such as maximum inscribed circles and single-branch shapes, for each polygon to be labeled; and (ii) generate rectangles and smoothed lines based on the dominant shapes. FIGS. 5A, 5B, and 5C illustrate an example polygon and corresponding dominant shapes, and FIGS. 6A and 6B illustrate an example rectangle and smoothed line generated based on the dominant shapes of FIGS. 5B and 5C.

Specifically, FIG. 5A illustrates an example polygon 500. As discussed with reference to FIG. 1, the map data server 12 or the polygon data source 39 may define the polygon 500 in a vector format via a set of vertices.

FIG. 5B illustrates an example maximum, or substantially largest, inscribed circle 502 corresponding to the polygon 500. The maximum inscribed circle 502 is the largest circle that can be completely enclosed in the polygon 500. As discussed further with respect to FIGS. 7, 8A, and 8B, the map data server 12 (e.g., executing the dominant shape generator 36) may determine the maximum inscribed circle based on a Voronoi diagram of the polygon 500.

FIG. 5C illustrates an example single-branch shape 504 corresponding to the polygon 500. As with the maximum inscribed circle 502, the polygon 500 encloses the single-branch shape 504, and, in some implementations, the map server 12 requires the single-branch shape 504 to enclose the maximum inscribed circle 502 such that line-type and point-type labels are positioned in a consistent manner. The single-branch shape 504 includes a centerline 506 having only one branch. That is, the centerline 506 (e.g., medial axis) of the single-branch shape 504 is one continuous line without splits or intersections.

Figure 7:
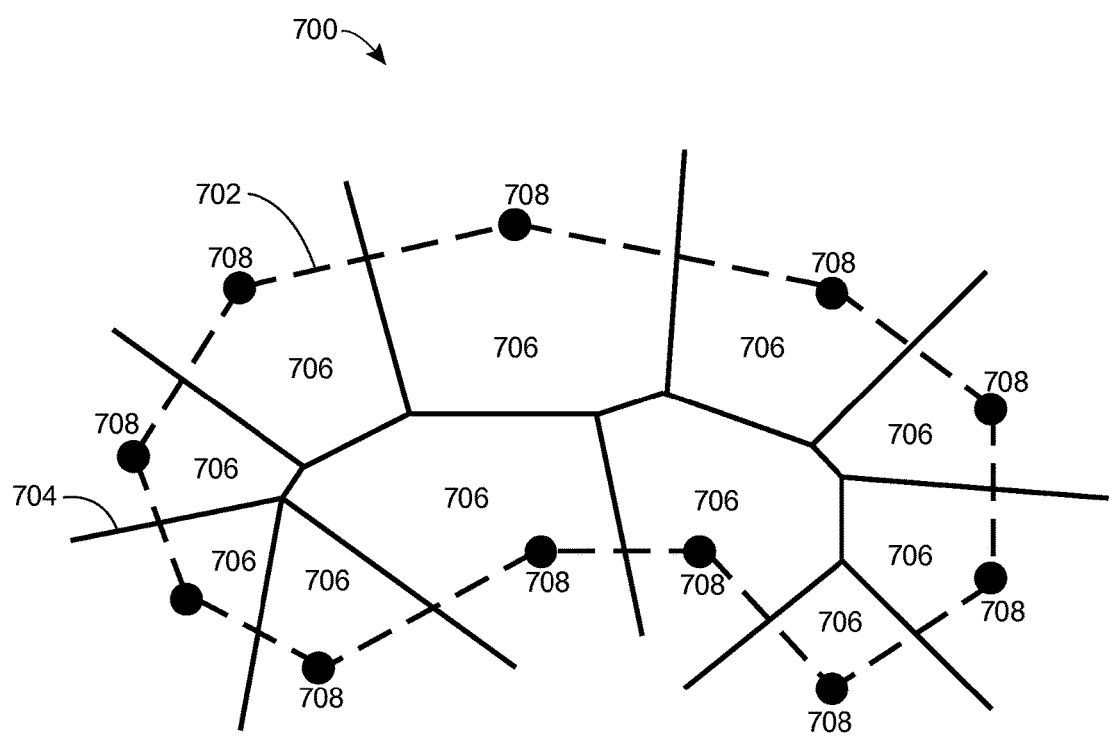
FIG. 7 is an example Voronoi diagram which can be generated by the system illustrated in FIG. 1 to determine maximum inscribed circles and/or single-branch shapes.

The map data server 12 may define the single-branch shape 504 via the coverage of the centerline 506 of the single-branch shape 504, and the map data server 12 may calculate the centerline 506 via a Voronoi diagram, as further discussed with reference to FIGS. 7, 9A, and 9B. In some implementations, the single-branch shape 504 may be bounded by portions of the boundary of the polygon 500 and arcs connecting the portions of the boundary of the polygon 500.

Referring now to FIGS. 6A and 6B, the map data server 12 may utilize the maximum inscribed circle 502 and the single-branch shape 504 to generate a rectangle 508 and a smoothed line 510 for positioning point-type labels and line-type labels, respectively, of the polygon 500. For example, the map data server 12 may execute the label position generator 37 to generate a rectangle and smoothed line for a polygon indicated in polygon data received from the polygon data source 39.

The rectangle 508 may be a bounding box of the maximum inscribed circle 502, in an implementation. For example, the rectangle 508 may be a smallest or minimum bounding box corresponding to the maximum inscribed circle 502. The smoothed line 510 may be a smoothed version of the centerline 506 of the single-branch shape 504. For example, the map data server 12 may utilize a moving average algorithm, or other suitable smoothing algorithm, to smooth the centerline 506 of the single-branch shape 504 and generate the smoothed line 510.

As discussed above, the map data server 12 may utilize a Voronoi diagram of the polygon 500 to generate the maximum inscribed circle 502 and the single-branch shape 510. FIG. 7 illustrates an example Voronoi diagram 700 for another example polygon 702. The Voronoi diagram 700 includes one or more line segments 704 that split the polygon 702 into cells 706. Each of the cells 706 corresponds to a certain one of a plurality of vertices 708 (also referred to herein as "sites") that define the polygon.

In some implementations, the map server 12 may only utilize some of the segments 704 of the Voronoi diagram 700 to generate dominant shapes. For example, the map data server 12 may only use segments 704 of the Voronoi diagram 700 that are enclosed within the boundaries of the polygon 702 (close to a "skeleton" of the polygon 702). Alternatively or additionally, the map data server 12 may resample the polygon 702 or the Voronoi diagram 700 to generate only a pre-defined number of segments 704 of the Voronoi diagram 700. In this manner, the map data server 12 may simplify or improve the calculation of dominant shapes for many polygons, where some of the polygons, if not resampled, would have a large number of segments of Voronoi diagrams due to complexities of the polygons.

To determine a maximum inscribed circle, such as the maximum inscribed circle 502, from the Voronoi diagram 700, the map data server 12 may compare radii of the segments 704. In particular, as illustrated in FIG. 8A, the map data server 12 may (e.g., executing the dominant shape generator 36) calculate a radius 800 of an example segment 802 of a Voronoi diagram (e.g., one of the segments 704), which radius 800 is the maximum distance from a vertex 804, or site, to an endpoint of the segment 802. The vertex 804 may be one of two vertices 804 and 806 that are equal distance to the segment 802.

This radius 800 indicates the maximum size of a circle that is enclosed within a polygon (corresponding to the Voronoi diagram) at the particular segment 802. As such, the map data server 12 may compare similar radii for all segments of a Voronoi diagram, or at least those inside the corresponding polygon, to determine the maximum inscribed circle of the corresponding polygon.

Although a connecting line 808 connecting the two vertices 804 and 806 is illustrated as passing through (e.g., intersecting) the segment 802, such connecting lines need not intersect corresponding segments. Inscribed circles, including a maximum inscribed circle, may be determined based on a segment 810 with corresponding vertices 812 and 814 connected by a connecting line 816 that does not intersect the segment 810, as illustrated in FIG. 8B.

To determine a single-branch shape, such as the single-branch shape 504, from the Voronoi diagram 700, the map data server 12 may compare sums of quantities computed from the Voronoi diagram 700, where each of the quantities computed from the Voronoi diagram 700 represents a coverage of one of the segments 704 of the Voronoi diagram 700. In particular, the map data server 12 may determine, based on the segments 704, the centerline of a single-branch shape by determining the medial axis line that covers the largest area of the corresponding polygon. In some implementations, the map data server 12 requires the centerline to have no self-intersections (e.g., loops), thus the centerline is a one-dimensional manifold. The coverage of the centerline, in such a case, is computed by the area $$A(l) = 2 \int_{x \in l} \text{radius}(x) dx.$$

Figures 9A, 9B:
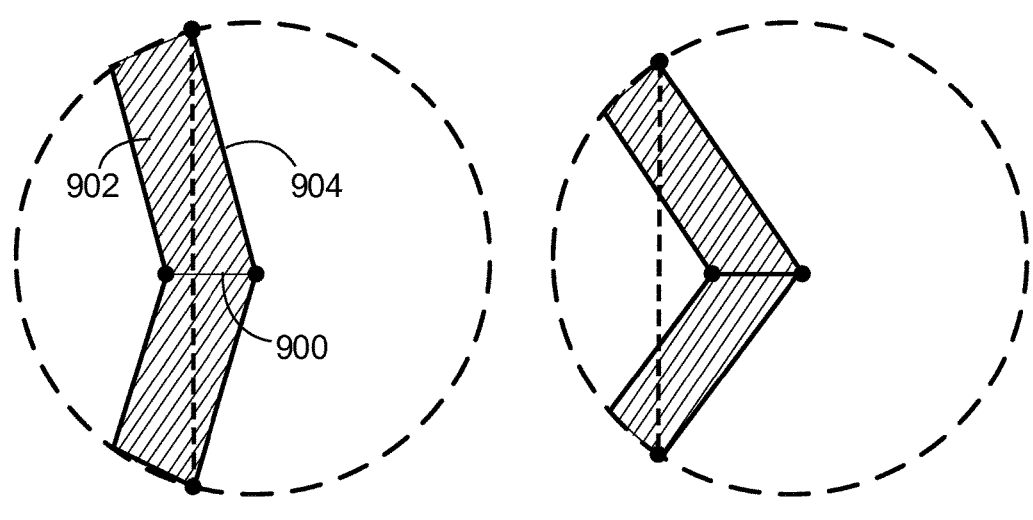
FIGS. 9A and 9B illustrate segments of a Voronoi diagram and corresponding areas used to determine a single-branch shape, such as the single-branch shape illustrated in FIG. 5C.

In a discretized version, such as a version utilizing segments of a Voronoi diagram, the map data server 12 may calculate the coverage of a particular segment 900 of a Voronoi diagram as an area 902 that spans over the segment 900 and a corresponding radius 904, as illustrated in FIG. 9A. The map data server 12 may approximate this area 902 as $A(s)=2*\text{lens}(s)*\text{radius}(s)$, where s indicates the particular segment of the Voronoi diagram, and, thus, the coverage of a line (e.g., made up of continuous segments of a Voronoi diagram) is $$A(l) = \sum_{s \in l} A(s).$$

The map data server 12 calculates the centerline of a single-branch shape, for a particular polygon, as the line constructed from Voronoi segments with the largest accumulated area, A(l). That is, the map data server 12 may compare (e.g., via a recursive algorithm and/or a global optimal search method) accumulated areas for various combinations of Voronoi segments making up continuous lines and select the centerline as the particular one of these combinations having the largest accumulated area. As illustrated in FIG. 9B, such a technique may be implemented for Voronoi segments corresponding to vertices connected by a line which may or may not intersect the Voronoi segment.

As discussed above, the map data server 12 may require that the centerline of a single-branch shape does not have loops (e.g., self-intersections). In many cases, a Voronoi diagram, such as the Voronoi diagram 700 is represented by a half edge data structure. For one of the segments of the Voronoi diagram, the map data server 12 may define two half edges with opposite directions, clockwise (CW) and counter-clockwise (CCW). For a polygon without holes, half edges with the same direction may form a directed acyclic graph (DAG). Therefore, for a polygon without holes, a single centerline having a largest coverage must exist.

Figure 10:
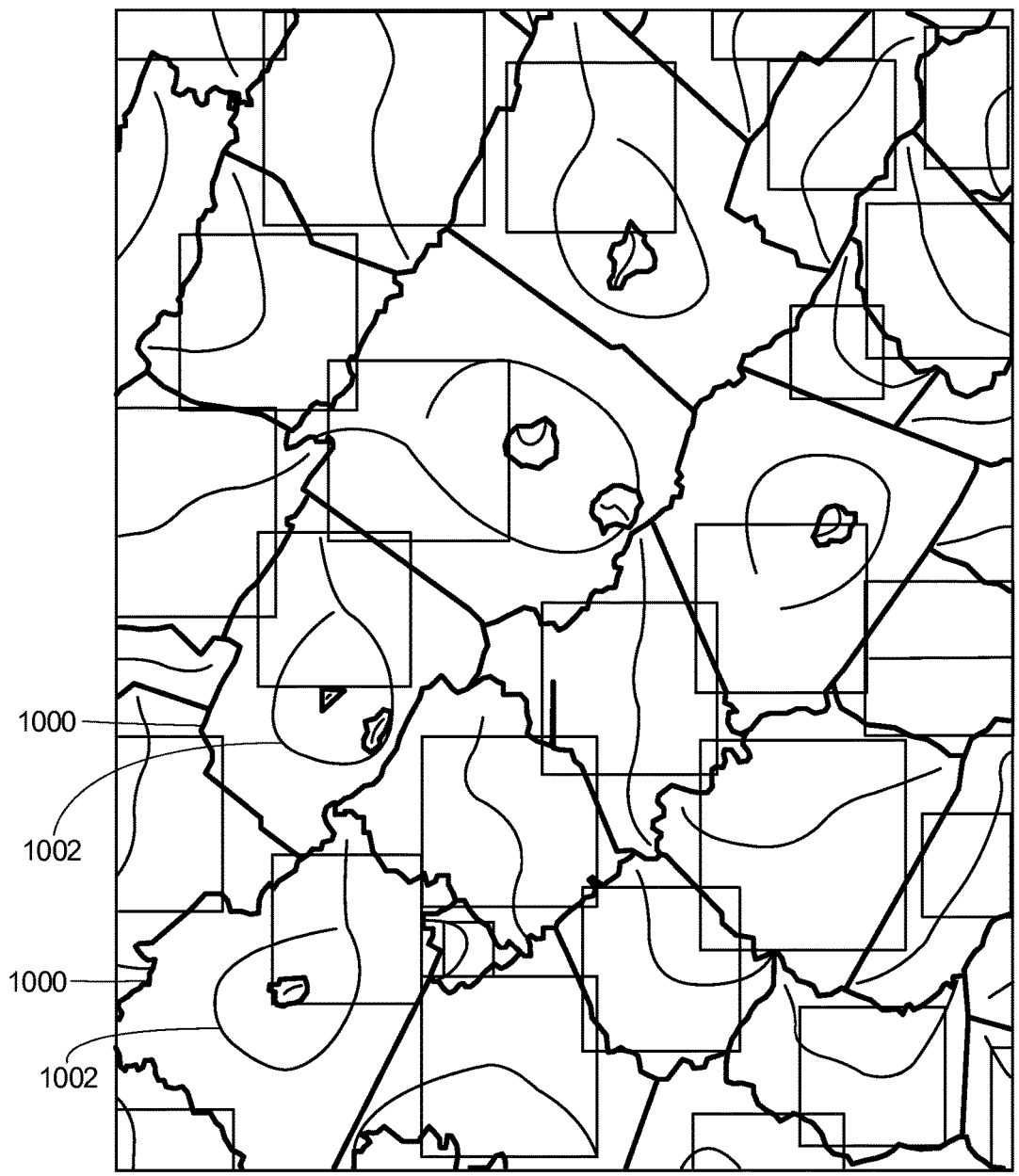
FIG. 10 illustrates example polygons with holes and corresponding smoothed lines which can be generated by the system illustrated in FIG. 1.

For polygons with holes (e.g., complex polygons), such as a polygon representing a lake with an island, the determined centerline according to the techniques discussed above has, at most, a single loop. In this case, the map data server 12 may break the centerline such that it has no self-intersection. That is, the map data server 12 may terminate a centerline some length before it self-intersects, remove one or more portions of the centerline around the region of self-intersection, etc. FIG. 10 illustrates one or more example polygons 1000 with holes and corresponding smoothed lines 1002 generated from centerlines of single-branch shapes that were broken to prevent self-intersection.

Figure 11:
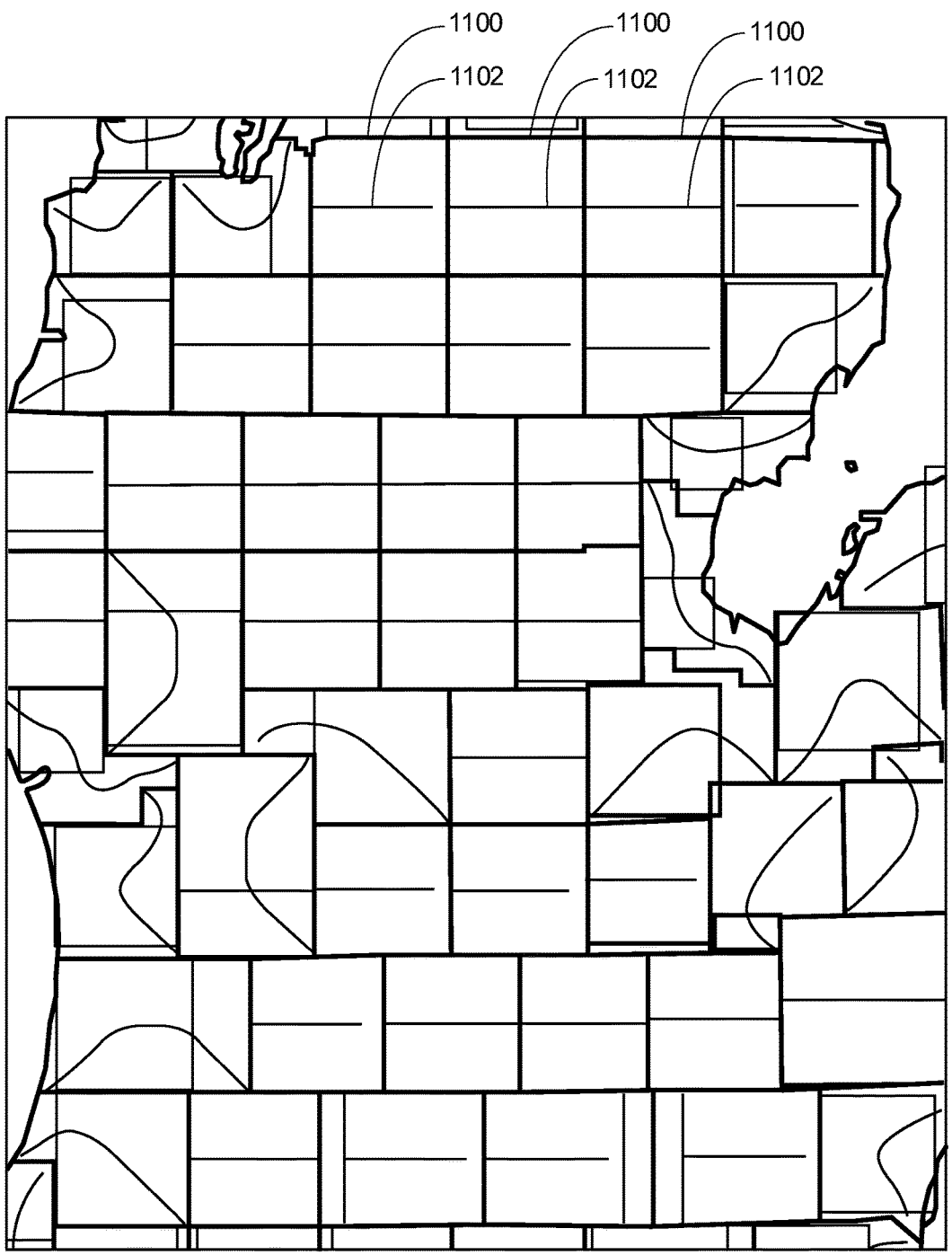
FIG. 11 illustrates example polygons substantially similar to squares or circles and corresponding smoothed lines which can be generated by the system illustrated in FIG. 1.

In some scenarios, in which dominant shapes, rectangles, and smoothed lines are generated for polygons substantially similar to a square or circle, the determined centerline of a single-branch shape may be very short (e.g., shorter than many line-type labels). As such, the map data server 12 may use a horizontal diameter of a maximum inscribed circle as the basis for a smoothed line. The map data server 12 may, for example: (i) calculate the centerline of the single-branch shape, as discussed above, (ii) determine that a length of the centerline is below a threshold, and (iii) and replace the centerline with the diameter of a maximum inscribed circle. FIG. 11 illustrates one or more example polygons 1100 substantially similar to squares or circles and corresponding smoothed lines 1102 generated from diameters of maximum inscribed circles.

Generating Positions for Polygon Labels

Figure 12:
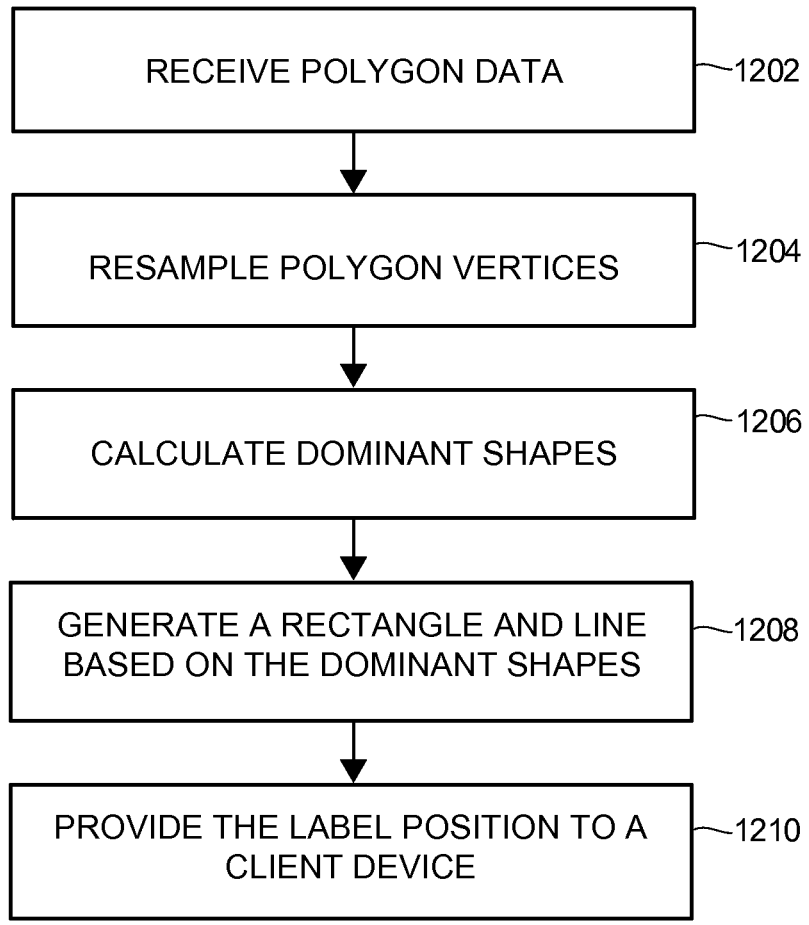
FIG. 12 is a flow diagram of an example method for generating positions of polygon labels which can be implemented in the system illustrated in FIG. 1.

FIG. 12 is a flow diagram of an example method 1200 for generating positions for polygon labels. The method 1200 may be implemented by the map data server 12, for example.

At block 1202, polygon data is received. The polygon data may include one or more vertices defining polygons, such as building, counties, cities, etc. in the context of a digital map. A polygon data source, such as the polygon data source 39, may send the polygon data to the map data server 12 to update or add to data stored in the map database 18. In many cases, this received polygon data may not include label positions and/or labels to place at the label positions.

At block 1204, polygon vertices are resampled and/or polygons are simplified. The map data server 12 may simplify polygons by resampling the vertices of a polygon to reduce the number of vertices representing a polygon. In this manner, the map data server 12 may reduce the computational cost of computing polygon label positions. For example, the polygon data source 39 may send indications of polygons to the map data server 12 in very high resolution (e.g., with a large number of vertices). The map data server 12 may reduce this high number of vertices to a default or otherwise defined number of vertices for each of the received indications of polygons. However, in some implementations, the map data server may skip block 1204 and generate polygon label positions based on any number of vertices representing a polygon.

At block 1206, dominant shapes are calculated for each polygon represented in the received polygon data. The map data server 12 may, for example, execute the dominant shape generator 36 to determine maximum inscribed circles and single-branch shapes, as further discussed with reference to FIGS. 5A, 5B, 5C, 7, 8A, 8B, 9A, and 9B. Then, at block 1208, the map data server 12 may generate rectangles and smoothed lines based on the dominant shapes. Although, smoothed lines are emphasized herein, a map data server may, in some implementations, utilize the centerline of a single-branch shape itself as a line on which a line-type label is placed. That is, the map data server 12 may define a position for a label as a rectangle and the centerline of the single-branch shape as opposed to a rectangle and a smoothed version of the centerline.

At block 1210, a position of a polygon label (e.g., a rectangle and a smoothed line) is provided to a client device. The map data server 12 may, for example, provide the client device 14 with indications of polygons, polygon labels, and corresponding positions for those polygon labels (rectangles and smoothed lines) when the client device 14 requests further or different map data.

Labeling Polygons

Figure 13:
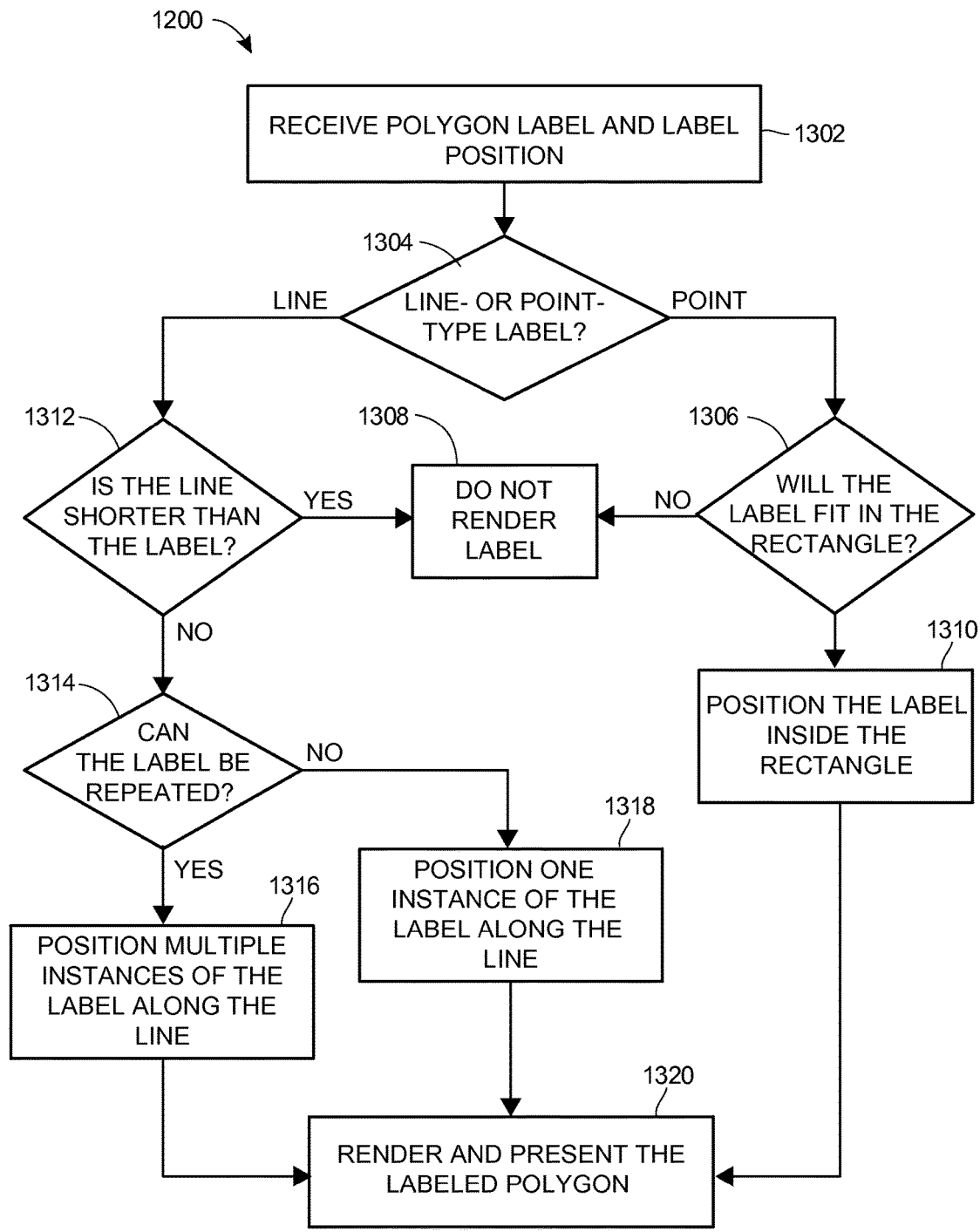
FIG. 13 is a flow diagram of an example method for labeling polygons, which can be implemented in the system illustrated in FIG. 1.

FIG. 13 is a flow diagram of an example method for labeling polygons based on a rectangles and smoothed lines. The rectangles and smoothed lines may be generated using the method 1200, and the method 1300 may be implemented by the client device 14, for example.

At block 1302, a polygon label and a corresponding position for the label are received. The client device may receive the position for the label in the form of an indication of a rectangle and a smoothed line, as generated in the method 1200. Next, the client device 14 may determine if the label is a point-type label or a line-type label (block 1304). In some implementations, the mapping application 50 may make such a determination based on rules programmed into the mapping application, a category of map features to which the label corresponds (business name, county name, etc.), a current or selected viewport or zoom level in which a user of the client device 14 is viewing a digital map, a type of device executing the mapping application (smartphone, tablet computer, etc.), etc. Alternatively, the map server 12 may communicate to the client device 14 that the polygon label is a point-type or line-type label.

If the label is a point-type label, it is then determined if the label will fit inside the received rectangle (block 1306). For example, the client device 14 may compare (e.g., by executing the labeling routine 70) an area covered by the label and an area covered by the rectangle. If the label will not fit in the rectangle, the label is not rendered by the client device 14 (block 1308). However, if the label fits inside the rectangle the client device 14 may position the label inside the rectangle (block 1310). For example, the client device 14 may encode a position for the label inside the rectangle into the graphic card 48 of the rendering module 38, or otherwise indicate to one or more processes executed by the rendering module 38 that the label is to be positioned within the rectangle. Generally, the client device 14 may position the label within the rectangle at any pre-determined, or otherwise determined, relative position, such as in the center, top, bottom, corner, etc. of the rectangle.

If the label is a line-type label, it is determined if the label is shorter than the received smoothed line (block 1312). For example, the client device 14 may compare (e.g., by executing the labeling routine 70) a length of the label and a length of a smoothed line. If the label is longer than the smoothed line, the label is not rendered by the client device 14 (block 1308). However, if the label is shorter than the smoothed line, it is determined if the label can be repeated along the smoothed line (block 1314). For example, the client device 14 may determine if multiples (2×, 3×, etc.) of the length of the label are shorter than the length of the line, and, thus, multiple instances of the label may be places along the smoothed line. If the label can be repeated, the client device 14 positions multiple instances of the label along the smoothed line. Otherwise, only one instance of the label is positioned along the smoothed line (block 1318).

Once the client device 14 positions the label at least one of along the smoothed line or inside of the rectangle, the client device 14 may render the labeled polygon and presented the rendered image to a user of the client device (block 1320). For example, the rendering module 38 of the client device 14 may cause a digital image of the labeled polygon, such as a labeled map feature, to be rendered and displayed on the touchscreen 44.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for labeling polygon through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for generating label positions for labeling polygons, the method comprising:

receiving, by one or more processors, a description of a polygon;

generating, by the one or more processors, a Voronoi diagram based on vertices of the polygon, determining, by the one or more processors, a substantially largest inscribed circle that fits within the polygon based on the Voronoi diagram, including:

calculating a respective radius of each of a plurality of segments of the Voronoi diagram that is enclosed within a boundary of the polygon, and selecting a largest radius from among the calculated radii, wherein the largest radius is a radius of the substantially largest inscribed circle;

determining, by the one or more processors based on the Voronoi diagram, a single-branch shape that fits completely within the polygon, wherein a centerline of the single-branch shape is a polyline that has: (i) only one branch, and (ii) a largest coverage of the polygon;

generating, by the one or more processors, an indication of a first candidate label position, based on the inscribed circle;

generating, by the one or more processors, an indication of a second candidate label position, based on the centerline; and providing, by the one or more processors, the indication of the first candidate label position and the indication of the second candidate label position to a rendering component for positioning a label for the polygon in accordance with at least one of the first candidate label position and the second candidate label position.

2. The method of claim 1, further comprising:

generating, by the one or more processors, a bounding box for the inscribed circle; wherein generating the indication of the first candidate label position is based on the bounding box.

3. The method of claim 1, wherein determining the largest coverage based on the Voronoi diagram includes:

for each of a plurality of segments of the Voronoi diagram, calculating, by the one or more processors, an area that covers the respective segment and that covers a radius corresponding to the respective segment, determining, by the one or more processors, the largest coverage corresponding to the centerline of the single-branch shape by identifying a continuous subset of the plurality of segments having an accumulated area greater than other continuous subsets of the plurality of segments, the accumulated area calculated by summing the area corresponding to each of the subset of the plurality of segments.

4. The method of claim 1, wherein the single-branch shape covers an area including the inscribed circle.

5. The method of claim 1, further comprising:
generating, by the one or more processors, a line based on the centerline of the single-branch shape, wherein the line based on the centerline of the single-branch shape is not self-intersecting, and wherein generating the indication of the second candidate label position is based on the line.

6. The method of claim 5, further comprising:
detecting, by the one or more processors, that the centerline of the single-branch shape includes a loop,
wherein generating the line based on the centerline of the single-branch shape includes breaking the centerline of the single-branch shape to cause the line based on the centerline to not self-intersect.

7. The method of claim 1, further comprising:
generating, by the one or more processors, a line based on the centerline of the single-branch shape, wherein generating the line based on the centerline includes smoothing the centerline of the single-branch shape to produce the line based on the centerline, and wherein generating the indication of the second candidate label position is based on the line.

8. A computing device comprising:
one or more processors; and
a non-transitory computer readable medium storing instructions thereon that, when executed by the one or more processors, cause the computing device to:
receive a description of a polygon,
determine an inscribed circle within the polygon,
determine a single-branch shape that fits completely within the polygon, wherein a centerline of the single-branch shape is a polyline that has: (i) only one branch, and (ii) a largest coverage of the polygon, wherein the centerline of the single-branch shape intersects a center point of the inscribed circle,
generate an indication of a first candidate label position, based on the inscribed circle,
generate an indication of a second candidate label position, based on the centerline, and
provide the indication of the first candidate label position and the indication of the second candidate label position to a rendering component for positioning a label for the polygon in accordance with at least one of the first candidate label position and the second candidate label position.

9. The computing device of claim 8,
wherein the received description of the polygon includes a received plurality of vertices,
wherein the instructions further cause the computing device to generate a resampled plurality of vertices representing the polygon based on the received plurality of vertices, the resampled plurality of vertices being fewer in number than the received plurality of vertices, and wherein determining the inscribed circle and the single-branch shape includes determining the inscribed circle and the single-branch shape based on the resampled plurality of vertices.

10. The computing device of claim 9,
wherein the instructions further cause the computing device to generate a Voronoi diagram based on the resampled plurality of vertices representing the polygon, and
wherein determining the inscribed circle and the single-branch shape includes determining the inscribed circle and the single-branch shape based on a plurality of segments of the Voronoi diagram.

11. The computing device of claim 9, wherein generating the resampled plurality of vertices includes simplifying the received plurality of vertices to a pre-defined number of the resampled plurality of vertices.

12. The computing device of claim 8, wherein the instructions further cause the computing device to:
generate a line based on the centerline of the single-branch shape, wherein generating the line based on the centerline includes smoothing the centerline of the single-branch shape to produce the line based on the centerline, and wherein generating the indication of the second candidate label position is based on the line,
detect that the line based on the centerline has a length below a threshold, and
replace the line based on the centerline with a horizontal diameter of the inscribed circle.

13. The computing device of claim 8, wherein a boundary of the single-branch shape includes portions of a boundary of the polygon connected by one or more arcs.

14. A method for generating label positions for labeling polygons, the method comprising:
receiving, by one or more processors, a description of a polygon;
determining, by the one or more processors, an inscribed circle within the polygon
determining, by the one or more processors, a single-branch shape that fits completely within the polygon, wherein a centerline of the single-branch shape is a polyline that has: (i) only one branch, and (ii) a largest coverage of the polygon;
detecting, by the one or more processors, that the centerline of the single-branch shape includes a loop,
generating, by the one or more processors, a line based on the centerline of the single-branch shape, including breaking the centerline of the single-branch shape to cause the line based on the centerline to not self-intersect;
generating, by the one or more processors, an indication of a first candidate label position, based on the inscribed circle;
generating, by the one or more processors, an indication of a second candidate label position, based on the line; and
providing, by the one or more processors, the indication of the first candidate label position and the indication of the second candidate label position to a rendering component for positioning a label for the polygon in accordance with at least one of the first candidate label position and the second candidate label position.

* * * * *